(12) United States Patent
Iwakuni et al.

(10) Patent No.: US 7,307,039 B2
(45) Date of Patent: Dec. 11, 2007

(54) EXHAUST GAS PURIFICATION CATALYST AND OXYGEN STORAGE COMPONENT FOR THE SAME

(75) Inventors: Hideharu Iwakuni, Hiroshima (JP); Asako Sadai, Hiroshima (JP); Masaaki Akamine, Hiroshima (JP); Seiji Miyoshi, Hiroshima (JP); Hiroshi Yamada, Hiroshima (JP); Akihide Takami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/200,305

(22) Filed: Aug. 10, 2005

(65) Prior Publication Data

US 2006/0052242 A1   Mar. 9, 2006

(30) Foreign Application Priority Data

Sep. 3, 2004   (JP)   ............... 2004-257249
Dec. 3, 2004   (JP)   ............... 2004-351154

(51) Int. Cl.
*B01J 23/10* (2006.01)
*B01J 23/00* (2006.01)
*B01J 21/00* (2006.01)

(52) U.S. Cl. .............. 502/304; 502/302; 502/327; 502/332; 502/333; 502/334; 502/339; 502/349; 502/439

(58) Field of Classification Search ........ 502/326–327, 502/302, 303, 304, 332–334, 339, 349, 355, 502/415, 439, 527.19
See application file for complete search history.

(56) References Cited

U.S. PATENT DOCUMENTS

| 3,840,471 | A | * | 10/1974 | Acres ................... 502/177 |
| 4,499,205 | A | * | 2/1985 | Masuda ............... 502/303 |
| 4,504,598 | A | * | 3/1985 | Ono et al. ............ 502/303 |
| 4,904,633 | A | * | 2/1990 | Ohata et al. ......... 502/304 |
| 4,906,176 | A | * | 3/1990 | Yamashita et al. ...... 431/7 |
| 5,015,617 | A | * | 5/1991 | Ohata et al. ......... 502/304 |
| 5,019,546 | A | * | 5/1991 | Murakami et al. ..... 502/303 |
| 5,075,276 | A | * | 12/1991 | Ozawa et al. ........ 502/304 |
| 5,559,073 | A |   | 9/1996 | Hu et al. |
| 5,597,771 | A | * | 1/1997 | Hu et al. ............. 502/304 |
| 5,814,576 | A | * | 9/1998 | Yamamoto ........... 502/303 |
| 6,150,288 | A |   | 11/2000 | Suzuki et al. |

(Continued)

FOREIGN PATENT DOCUMENTS

EP   0 834 348 A2   4/1998

(Continued)

OTHER PUBLICATIONS

European Search Report dated Dec. 16, 2005.

*Primary Examiner*—Cam N. Nguyen
(74) *Attorney, Agent, or Firm*—Nixon Peabody LLP; Donald R. Studebaker

(57) ABSTRACT

In an exhaust gas purification catalyst comprising a honeycomb support and a catalytic layer that is formed on wall surfaces of each cell of the honeycomb support and contains active alumina and a mixed oxide containing Ce, Zr and Nd and doped with catalytic precious metal, the mixed oxide has a $CeO_2/ZrO_2$ mass ratio of 1.4 or more and the ratio of $Nd_2O_3/(CeO_2+ZrO_2+Nd_2O_3)$ in the mixed oxide is 20 mass % or less.

7 Claims, 14 Drawing Sheets

U.S. PATENT DOCUMENTS

| | | | |
|---|---|---|---|
| 6,248,688 B1* | 6/2001 | Wu et al. | 502/302 |
| 6,254,842 B1* | 7/2001 | Hu et al. | 423/213.5 |
| 6,294,140 B1* | 9/2001 | Mussmann et al. | 423/213.5 |
| 6,350,421 B1* | 2/2002 | Strehlau et al. | 423/213.2 |
| 6,492,297 B1* | 12/2002 | Sung | 502/304 |
| 6,524,992 B2* | 2/2003 | Mussmann et al. | 502/304 |
| 6,764,665 B2* | 7/2004 | Deeba et al. | 423/239.1 |
| 2003/0083193 A1* | 5/2003 | Takaya et al. | 502/304 |
| 2003/0100447 A1* | 5/2003 | Deeba et al. | 502/339 |
| 2004/0028589 A1* | 2/2004 | Reisinger et al. | 423/240 S |
| 2004/0184978 A1* | 9/2004 | Nakatsuji | 423/239.1 |
| 2004/0198592 A1* | 10/2004 | Hu et al. | 502/304 |
| 2004/0198595 A1* | 10/2004 | Chen | 502/328 |
| 2005/0103001 A1* | 5/2005 | Kupe et al. | 60/286 |
| 2005/0129588 A1* | 6/2005 | Nunan | 422/177 |
| 2005/0227867 A1* | 10/2005 | Chen et al. | 502/325 |
| 2005/0265920 A1* | 12/2005 | Ercan et al. | 423/651 |

FOREIGN PATENT DOCUMENTS

| | | |
|---|---|---|
| JP | 10-182155 | 7/1998 |
| JP | 11-130436 | 5/1999 |
| JP | 2004-174490 | 6/2004 |
| JP | 2005028334 | 2/2005 |

* cited by examiner

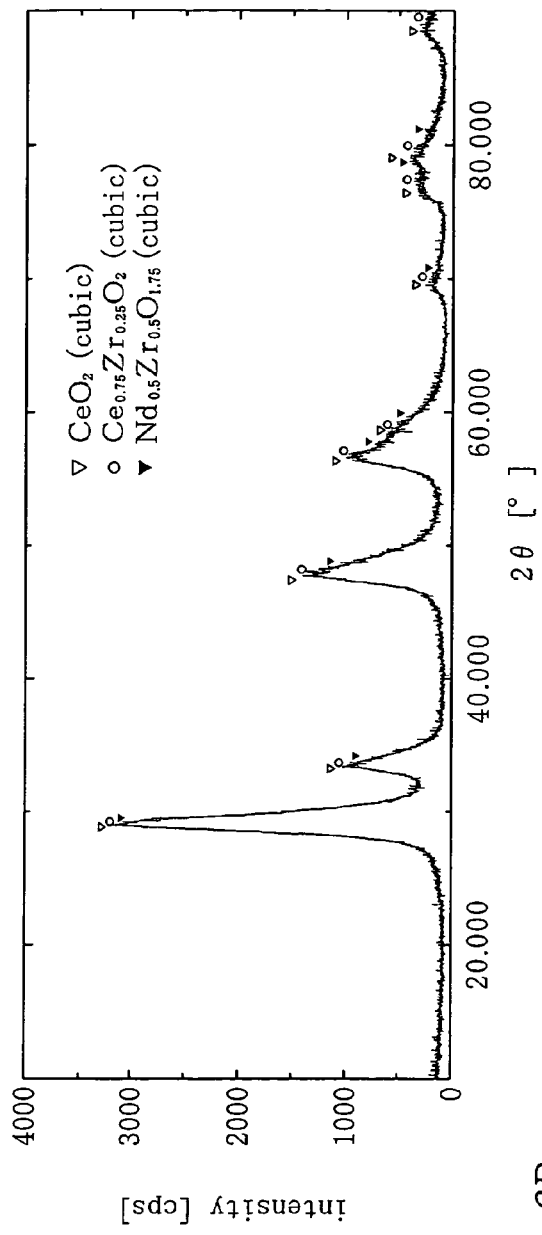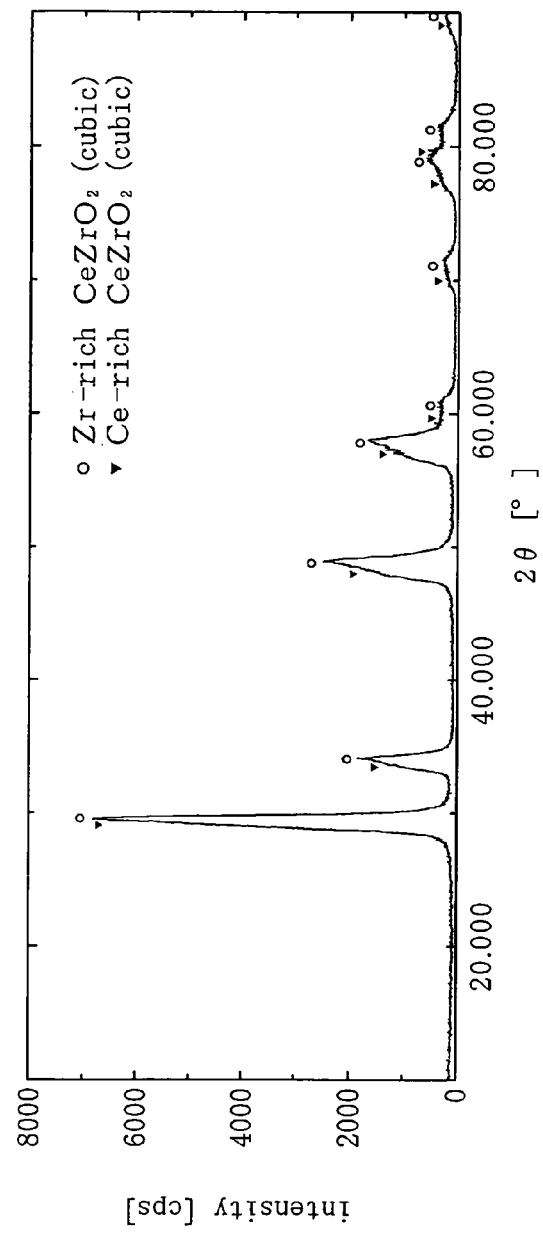
FIG. 6A
FIG. 6B

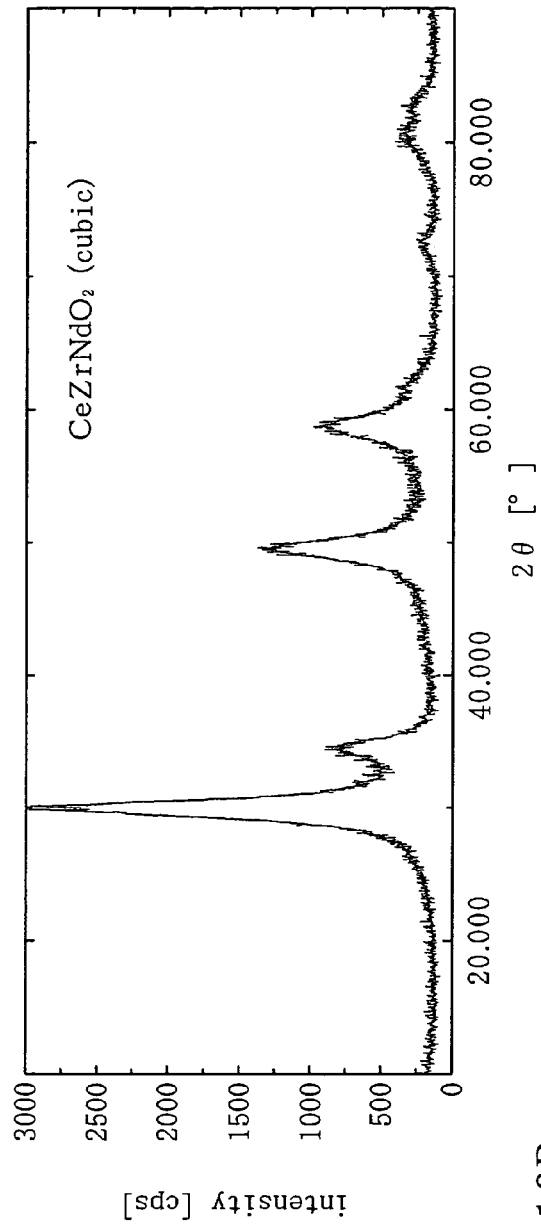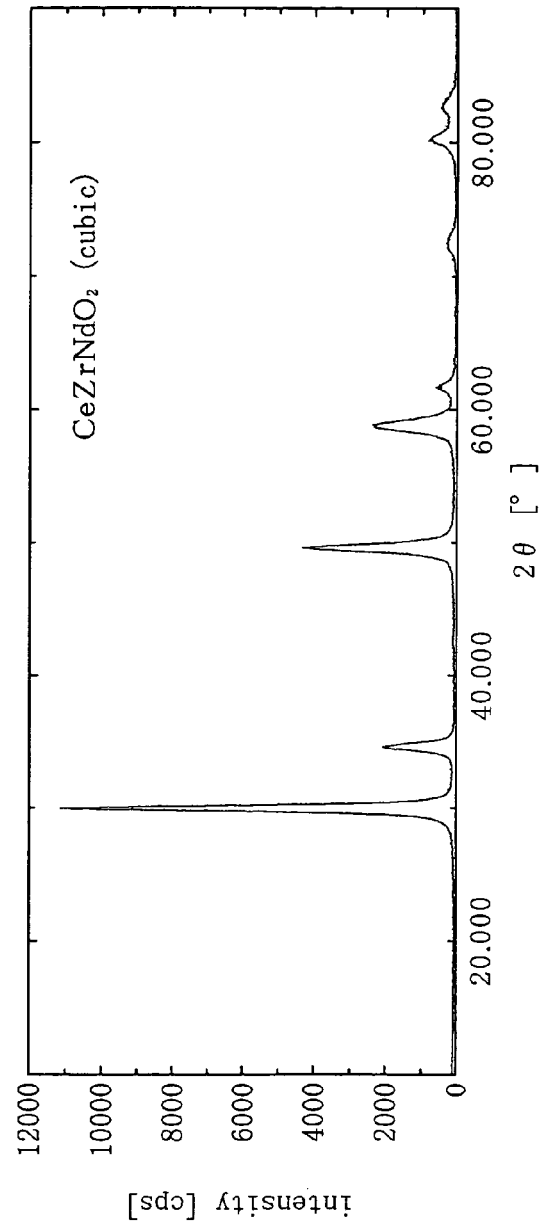
FIG. 10A
FIG. 10B

US 7,307,039 B2

EXHAUST GAS PURIFICATION CATALYST AND OXYGEN STORAGE COMPONENT FOR THE SAME

CROSS-REFERENCES TO RELATED APPLICATIONS

This application claims priority under 35 USC 119 to Japanese Patent Application No. 2004-257249, filed on Sep. 3, 2004, and Japanese Patent Application No. 2004-351154, filed on Dec. 3, 2004, the entire contents of all of which are incorporated herein by reference.

BACKGROUND OF THE INVENTION (a) Field of the Invention

The invention relates to an exhaust gas purification catalyst and an oxygen storage component for the same.

(b) Description of the Related Art

Exhaust gas purification catalysts, such as three-way catalysts, for removing hydrocarbon (HC), carbon monoxide (CO) and nitrogen oxides (NOx) in exhaust gas from an engine contain catalytic precious metal, such as platinum (Pt), palladium (Pd) and/or rhodium (Rh), supported on a support material. If the amount of supported precious metal is increased, the capacity to remove the above pollutants in exhaust gas can be enhanced theoretically. Actually, however, the capacity is deteriorated because of sintering of precious metal due to exhaust gas heat. In addition, the increase in the amount of precious metal leads to cost rise. Therefore, a significant challenge in developing catalysts is to place catalytic precious metal in a highly dispersed manner on and in a support material.

Japanese Unexamined Patent Publication No. 2004-174490 discloses, as a technique for highly dispersing catalytic precious metal on and in a support material, that on wall surfaces of each cell of a honeycomb support is formed a catalytic layer which contains active alumina and an oxygen storage component made of a mixed oxide containing cerium (Ce), zirconium (Zr) and neodymium (Nd) and doped with rhodium (Rh) serving as a catalytic precious metal to place its atoms at and/or between crystal lattice points of the mixed oxide, that the mass ratio of $ZrO_2$:$CeO_2$:$Nd_2O_3$ is 72.8:24.5:2.6, and that the amount of Rh is 0.486 mass %. In other words, the above technique aims at making Rh less susceptible to sintering while highly dispersing it on and in a support material by placing Rh atoms at and/or between crystal lattice points of the mixed oxide. Further, the above technique also aims at improving the oxygen storage capacity of the mixed oxide by virtue of Rh existing inside the mixed oxide.

Furthermore, the above publication discloses that, for Ce—Zr mixed oxides containing no neodymium, the preferable ratio of $ZrO_2/(CeO_2+ZrO_2)$ is 20 to 30 mass % both inclusive or 65 to 90 mass % both inclusive.

SUMMARY OF THE INVENTION

The inventors have pursued further studies of the mixed oxide as described above, from the viewpoints of anti-sintering of catalytic precious metal and reduction of the catalyst cost, toward reducing the amount of catalytic precious metal atoms placed at and/or between crystal lattice points of the mixed oxide. In order to enhance the exhaust gas purification performance of the catalyst, it is important that some of the catalytic precious metal atoms doped in the mixed oxide are exposed at the surface thereof. If the amount of catalytic precious metal atoms doped in the mixed oxide is decreased, however, the amount of catalytic precious metal atoms exposed at the mixed oxide surface is also decreased. This reduces the chance that the exhaust gas comes into contact with the catalytic precious metal, thereby deteriorating the exhaust gas purification performance of the catalyst. In particular, when the catalytic material is exposed to high-temperature exhaust gas, the mixed oxide is sintered to grow in crystal grains so that its specific surface area is reduced. In addition, the catalytic precious metal atoms are buried in mixed oxide grains grown so that the amount of catalytic precious metal atoms exposed at the mixed oxide surface is reduced. Therefore, the exhaust gas purification performance of the catalyst is extensively deteriorated.

With the foregoing in mind, an object of the present invention is to give, to an exhaust gas purification catalyst that contains a mixed oxide containing Ce, Zr and Nd and doped with catalytic precious metal, improved heat resistance such that the catalyst can sustain high exhaust gas purification performance for a long time even if the mixed oxide is doped with a small amount of catalytic precious metal, and concurrently reduce the catalyst cost.

The inventors have found that the $CeO_2/ZrO_2$ mass ratio and the ratio of $Nd_2O_3/(CeO_2+ZrO_2+Nd_2O_3)$ in the mixed oxide are important to solve the above problems, and have made the present invention based on the founding.

More specifically, a first aspect of the present invention is directed to an exhaust gas purification catalyst in which a catalytic layer is formed on wall surfaces of each cell of a honeycomb support and contains active alumina and a mixed oxide with oxygen storage/release capacity which contains Ce, Zr and Nd and is doped with precious metal to place atoms of the precious metal at and/or between crystal lattice points of the mixed oxide, wherein the mixed oxide has a $CeO_2/ZrO_2$ mass ratio of 1.4 or more and the ratio of $Nd_2O_3/(CeO_2+ZrO_2+Nd_2O_3)$ in the mixed oxide is 20 mass % or less.

A second aspect of the present invention is directed to the exhaust gas purification catalyst according to the first aspect of the invention, wherein the ratio of $Nd_2O_3/(CeO_2+ZrO_2+Nd_2O_3)$ in the mixed oxide is 12 mass % or less.

A third aspect of the present invention is directed to an oxygen storage component for an exhaust gas purification catalyst, composed of a mixed oxide that contains Ce, Zr and Nd, is doped with precious metal to place atoms of the precious metal at and/or between crystal lattice points of the mixed oxide and is used in a catalytic layer on wall surfaces of each cell of a honeycomb support, wherein the mixed oxide has a $CeO_2/ZrO_2$ mass ratio of 1.4 or more and the ratio of $Nd_2O_3/(CeO_2+ZrO_2+Nd_2O_3)$ in the mixed oxide is 20 mass % or less.

A fourth aspect of the present invention is directed to the oxygen storage component according to the third aspect of the present invention, wherein the ratio of $Nd_2O_3/(CeO_2+ZrO_2+Nd_2O_3)$ in the mixed oxide is 12 mass % or less.

In the above aspects of the present invention, since the mixed oxide has a large $CeO_2/ZrO_2$ mass ratio of 1.4 or more, it is likely to generate $CeO_2$ crystals and therefore likely to have a two-phase crystal structure consisting of a $CeO_2$ crystal phase and a Ce—Zr mixed oxide crystal phase, or a multi-phase crystal structure consisting of a $CeO_2$ crystal phase, a Ce—Zr mixed oxide crystal phase and one or more other mixed oxide crystal phases. Therefore, even if the mixed oxide is heated, different crystals of different crystal phases interfere with each other to prevent crystal grain growth. Since, however, the increase in the ratio of $Nd_2O_3/(CeO_2+ZrO_2+Nd_2O_3)$ in the mixed oxide invites deteriorated crystallinity of $CeO_2$ and ease of crystal grain growth, the ratio of $Nd_2O_3/(CeO_2+ZrO_2+Nd_2O_3)$ is set at 20 mass % or less in this aspect of the invention.

Since the crystal grain growth of the mixed oxide is prevented as described above, catalytic precious metal atoms that should be exposed at the surface of the mixed oxide are less likely to be buried inside the mixed oxide, which enables excellent oxygen storage capacity and exhaust gas purification performance to be sustained for a long time.

The ratio of $Nd_2O_3/(CeO_2+ZrO_2+Nd_2O_3)$ is more preferably 12 mass % or less (for example, within the range from 1 to 12 mass % both inclusive) in order to prevent the crystal grain growth of the mixed oxide.

A fifth aspect of the present invention is directed to an exhaust gas purification catalyst in which a catalytic layer is formed on wall surfaces of each cell of a honeycomb support and contains active alumina and a mixed oxide with oxygen storage/release capacity which contains Ce, Zr and Nd and is doped with precious metal to place atoms of the precious metal at and/or between crystal lattice points of the mixed oxide, wherein the ratio of $ZrO_2/(CeO_2+ZrO_2)$ in the mixed oxide is within the range from 65 to 90 mass % both inclusive and the ratio of $Nd_2O_3/(CeO_2+ZrO_2+Nd_2O_3)$ in the mixed oxide is within the range from 2.6 exclusive to 40 mass % inclusive.

A sixth aspect of the present invention is directed to an oxygen storage component for an exhaust gas purification catalyst, composed of a mixed oxide which contains Ce, Zr and Nd, is doped with precious metal to place atoms of the precious metal at and/or between crystal lattice points of the mixed oxide and is used in a catalytic layer on wall surfaces of each cell of a honeycomb support, wherein the ratio of $ZrO_2/(CeO_2+ZrO_2)$ in the mixed oxide is within the range from 65 to 90 mass % both inclusive and the ratio of $Nd_2O_3/(CeO_2+ZrO_2+Nd_2O_3)$ in the mixed oxide is within the range from 2.6 exclusive to 40 mass % inclusive.

A seventh aspect of the present invention is directed to the oxygen storage component according to the sixth aspect of the present invention, wherein the ratio of $Nd_2O_3/(CeO_2+ZrO_2+Nd_2O_3)$ in the mixed oxide is within the range from 5 to 35 mass % both inclusive.

In the above fifth to seventh aspects of the invention, since the ratio of $ZrO_2/(CeO_2+ZrO_2)$ in the mixed oxide is within the range from 65 to 90 mass % both inclusive, the catalyst using the mixed oxide can improve its low-temperature activity and the exhaust gas purification catalyst using the mixed oxide can enhance its high-temperature catalytic purification performance.

A more important point in the above fifth to seventh aspects is that the ratio of $Nd_2O_3/(CeO_2+ZrO_2+Nd_2O_3)$ in the mixed oxide is within the range from 2.6 exclusive to 40 mass % inclusive. When the $Nd_2O_3$ ratio exceeds 2.6 mass %, the specific surface area for the catalytic material abruptly increases and the percent of reduction in the specific surface area for the catalytic material when exposed to high-temperature gas decreases.

The increase in the specific surface area means that a large number of micro pores are formed in the mixed oxide and a large number of precious metal atoms at and/or between crystal lattice points of the mixed oxide are correspondingly exposed at the surface of the mixed oxide (the surfaces of the micro pores). This increases the chance of contact between precious metal and gas to be processed by the catalyst, which enhances the catalytic activity.

The decrease in the percent of reduction in the specific surface area for the mixed oxide when exposed to high-temperature gas means that the mixed oxide has higher heat resistance. The reason for this is probably that with the increase in the $Nd_2O_3$ ratio, the mixed oxide gradually changes its crystal structure from a tetragonal system toward a cubic system and accordingly becomes thermally more stable (which will be apparent in the later-described embodiment). Further, the change of the crystal structure of the mixed oxide toward a cubic system means that the mixed oxide approaches the crystal structure of ceria which is known to be excellent in the oxygen storage capacity (i.e., the capacity to store oxygen when the oxygen concentration in exhaust gas is high and release stored oxygen when the oxygen concentration becomes low), and in turn that the mixed oxide has a better oxygen storage capacity. This is advantageous in promoting the catalytic reaction in which oxygen involves. Therefore, the $Nd_2O_3$ ratio is preferably set high such that the crystal structure of the mixed oxide becomes a cubic system.

The higher the $Nd_2O_3$ ratio, the larger the specific surface area for the mixed oxide and the higher the heat resistance therefor. However, when the $Nd_2O_3$ ratio exceeds 30 mass %, the catalytic performance becomes saturated (the specific surface area for the mixed oxide is not substantially increased). By contrast, the ratio of $CeO_2$ to the whole mixed oxide becomes relatively small with the increase in the $Nd_2O_3$ ratio, so that the mixed oxide has a disadvantage for low-temperature catalytic activity and high-temperature catalytic purification performance. Therefore, the $Nd_2O_3$ ratio is preferably 40 mass % or less, more preferably within the range from 5 to 35 mass % both inclusive.

BRIEF DESCRIPTION OF THE DRAWINGS

FIGS. 6A and 6B show XRD patterns for a mixed oxide of Example 2 of the present invention when the mixed oxide is fresh and after it is aged, respectively.

FIGS. 10A and 10B show XRD patterns for a mixed oxide of Comparative example 2 when the mixed oxide is fresh and after it is aged, respectively.

DETAILED DESCRIPTION OF THE INVENTION

An embodiment of the present invention will be described below in detail with reference to the drawings.

Figure 1:
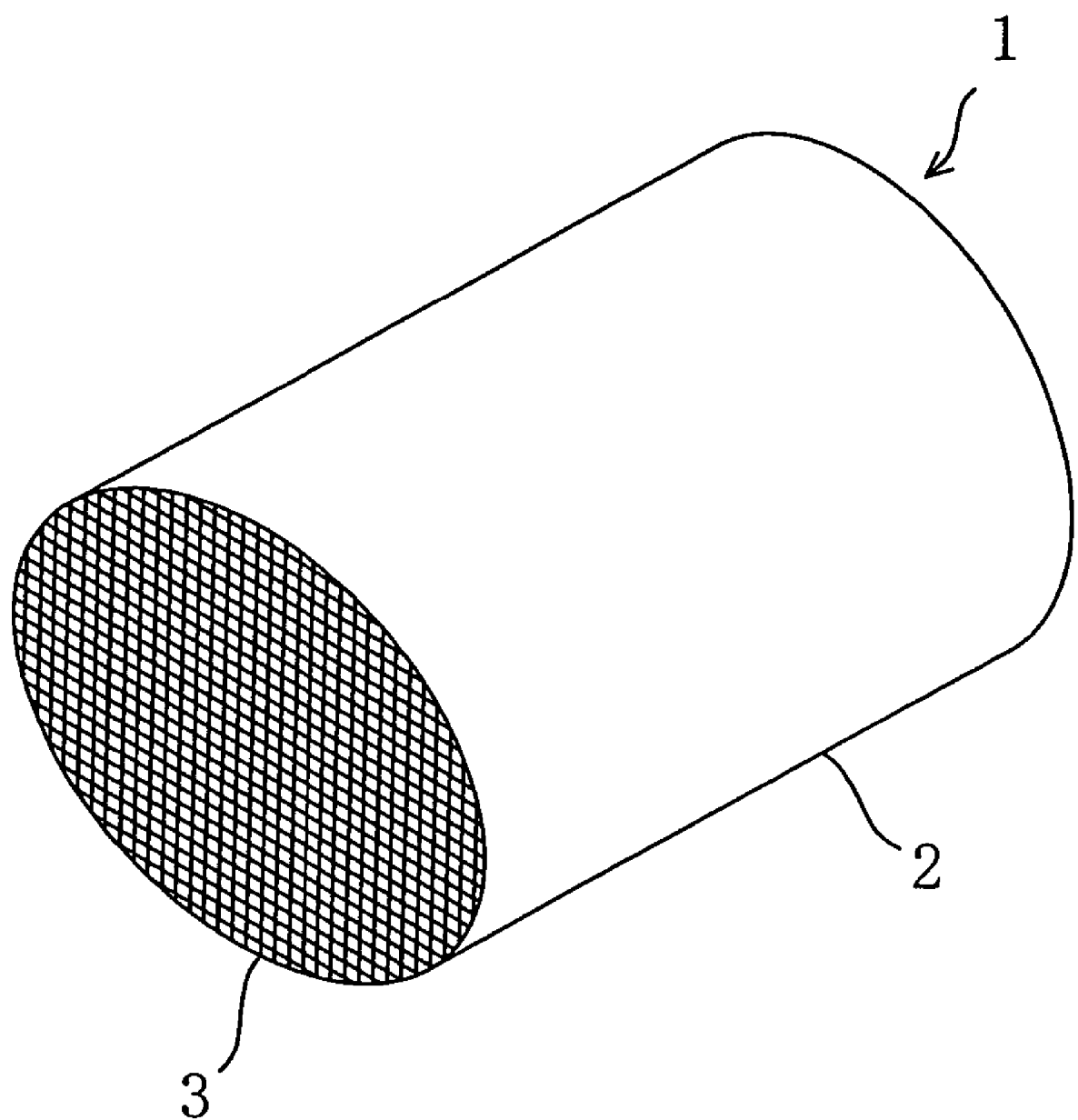
FIG. 1 is a perspective view of an exhaust gas purification catalyst according to an embodiment of the present invention.
Figure 2:
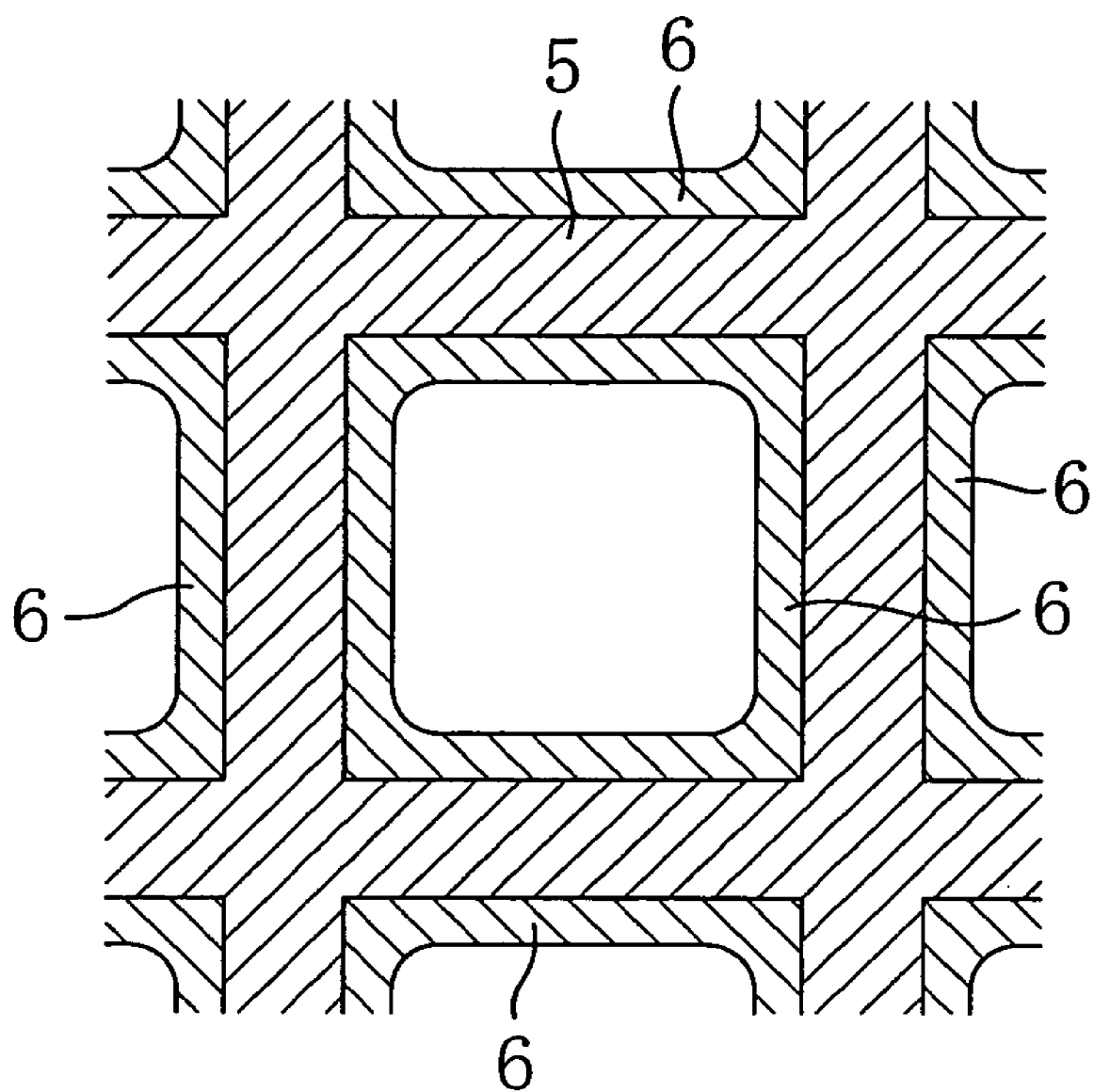
FIG. 2 is an enlarged cross-sectional view of part of the catalyst.

FIG. 1 shows an exhaust gas purification catalyst (three-way catalyst) 1 which will be placed in an exhaust path of a vehicle engine. The catalyst 1 includes a porous monolith support (honeycomb support) 2 having a large number of cells 3 passing through the support 2 in the flow direction of exhaust gas. A catalytic layer 6 for purifying exhaust gas is formed on the walls 5 of each cell as shown in FIG. 2.

The catalytic layer 6 is composed of active alumina, a binder and a mixed oxide with oxygen storage/release capacity. The mixed oxide contains Ce, Zr, Nd and is doped with catalytic precious metal to place atoms of the catalytic precious metal at and/or between crystal lattice points of the mixed oxide. With a ceria-rich composition, the $CeO_2/ZrO_2$ mass ratio of the mixed oxide is set at 1.4 or more and the ratio of $Nd_2O_3/(CeO_2+ZrO_2+Nd_2O_3)$ in the mixed oxide is set at 20 mass % or less. With a zirconia-rich composition, the ratio of $ZrO_2/(CeO_2+ZrO_2)$ in the mixed oxide is set at 65 to 90 mass % both inclusive and the ratio of $Nd_2O_3/(CeO_2+ZrO_2+Nd_2O_3)$ in the mixed oxide is set at 2.6 exclusive to 40 mass % inclusive.

The mixed oxide and the active alumina may additionally support catalytic precious metal of the same kind as or a different kind from the above catalytic precious metal. Further, in the present invention, the catalytic layer 6 and another one or more catalytic layers of different compositions may be formed in piles on the surfaces of walls 5 of each cell.

Hereinafter, the determination of the $CeO_2/ZrO_2$ mass ratio and the ratio of $Nd_2O_3/(CeO_2+ZrO_2+Nd_2O_3)$ in the mixed oxide will be described with reference to examples and comparative examples of the catalytic layer 6.

Ceria-rich composition; Determination of $CeO_2/ZrO_2$ Mass Ratio

EXAMPLES 1 AND 2 AND COMPARATIVE EXAMPLES 1 AND 2

In order to prepare each of mixed oxides having respective percent compositions shown in Table 1 (where they have the same ratio of $Nd_2O_3/(CeO_2+ZrO_2+Nd_2O_3)$ of 10 mass % and different $CeO_2/ZrO_2$ mass ratios), respective predetermined amounts of zirconium oxynitrate solution, cerous nitrate solution, neodymium nitrate solution and 0.8294 mass % rhodium nitrate solution were first mixed with water to make a total volume of 300 mL, and the mixed solution was stirred at room temperature for about an hour. Thereafter, the mixed solution was heated to 80° C. and then mixed with 50 mL of 28% aqueous ammonia by adding the aqueous ammonia at a stroke and quickly stirring the mixed solution, thereby completing the reaction of the mixed oxide with the aqueous ammonia within one second. The cloudy solution resulting from the mixture of aqueous ammonia was allowed to stand for a day and night to produce a cake, and the cake was centrifuged and well rinsed in water. The water-rinsed cake was dried by heating it at approximately 150° C., and then calcined under the condition of keeping it at 400° C. for five hours and then keeping it at 500° C. for two hours.

Note that Comparative example 2 in Table 1 is not an example of the known art but an example of the later-described zirconia-rich mixed oxide of the present invention.

TABLE 1

| | Percent composition (mass %) | | | | $CeO_2/$ $ZrO_2$ | $Nd_2O_3/CeO_2+$ $ZrO_2+Nd_2O_3)$ |
|---|---|---|---|---|---|---|
| | $Nd_2O_3$ | $CeO_2$ | $ZrO_2$ | Rh | | |
| Example 1 | 10 | 67.4 | 22.5 | 0.1116 | 3/1 | 10 mass % |
| Example 2 | 10 | 52.4 | 37.5 | 0.1116 | 1.4/1 | 10 mass % |
| Comparative ex. 1 | 10 | 44.95 | 44.95 | 0.1116 | 1/1 | 10 mass % |
| Comparative ex. 2 | 10 | 22.5 | 67.4 | 0.1116 | 1/3 | 10 mass % |

Since each of the mixed oxides obtained in the above manner is produced by adding Rh to a solution containing its source material and using coprecipitation, Rh atoms are placed at crystal lattice points of the mixed oxide like Ce and Zr atoms or, in other words, Rh atoms are strongly bonded to the mixed oxide. Otherwise, Rh atoms are placed between crystal lattice points of the mixed oxide. In either case, Rh atoms are dispersed uniformly on the surface and inside the mixed oxide. The Rh amount of each mixed oxide is 0.1116 mass %.

The above mixed oxides were individually mixed with respective predetermined amounts of active alumina, a binder (Zircozol AC-7 made by Daiichi Kigenso Kagaku Kogyo Co., Ltd) and water to prepare slurries. Honeycomb supports made of cordierite were immersed in and then pulled out of the prepared slurries, respectively. Excess slurries were blown off from the honeycomb supports, and the supports were calcined at 500° C. for two hours, thereby obtaining catalysts of Examples 1 and 2 and Comparative examples 1 and 2. The catalysts were aged by keeping them at 1000° C. in a normal atmosphere for 24 hours.

Each support has 25.4 mm diameter, 50 mm length, 400 cells per square inch (approximately 6.54 $cm^2$), and 4 mill (approximately 0.1 mm) inter-cell wall thickness. The amount of supported Rh per L of support in each catalyst is 0.125 g.

Evaluation of Catalyst Performance

After aged in the above manner, each catalyst was attached to a model gas flow reactor, allowed to pass a model gas of rich A/F ratio (temperature: 600° C.) for 10 minutes, and then measured in terms of light-off temperatures T50 and high-temperature catalytic conversion efficiencies C500 for conversions of HC, CO and NOx by an exhaust gas analyzer. T50 indicates the gas temperature at the entrance of each catalyst when the gas conversion efficiency reaches 50% after the temperature of the model gas flowing into the catalyst is gradually increased from normal temperature. C500 indicates the catalytic conversion efficiency when the gas temperature at the catalyst entrance is 500° C. The model gas had an A/F ratio of 14.7±0.9. Specifically, a mainstream gas was allowed to flow constantly at an A/F ratio of 14.7 and a predetermined amount of gas for changing the A/F ratio was added in pulses at a rate of 1 Hz, so that the A/F ratio was forcedly oscillated within the range of ±0.9. The space velocity SV was 60000 $h^{-1}$, and the rate of temperature rise was 30° C./min.

Figure 3:
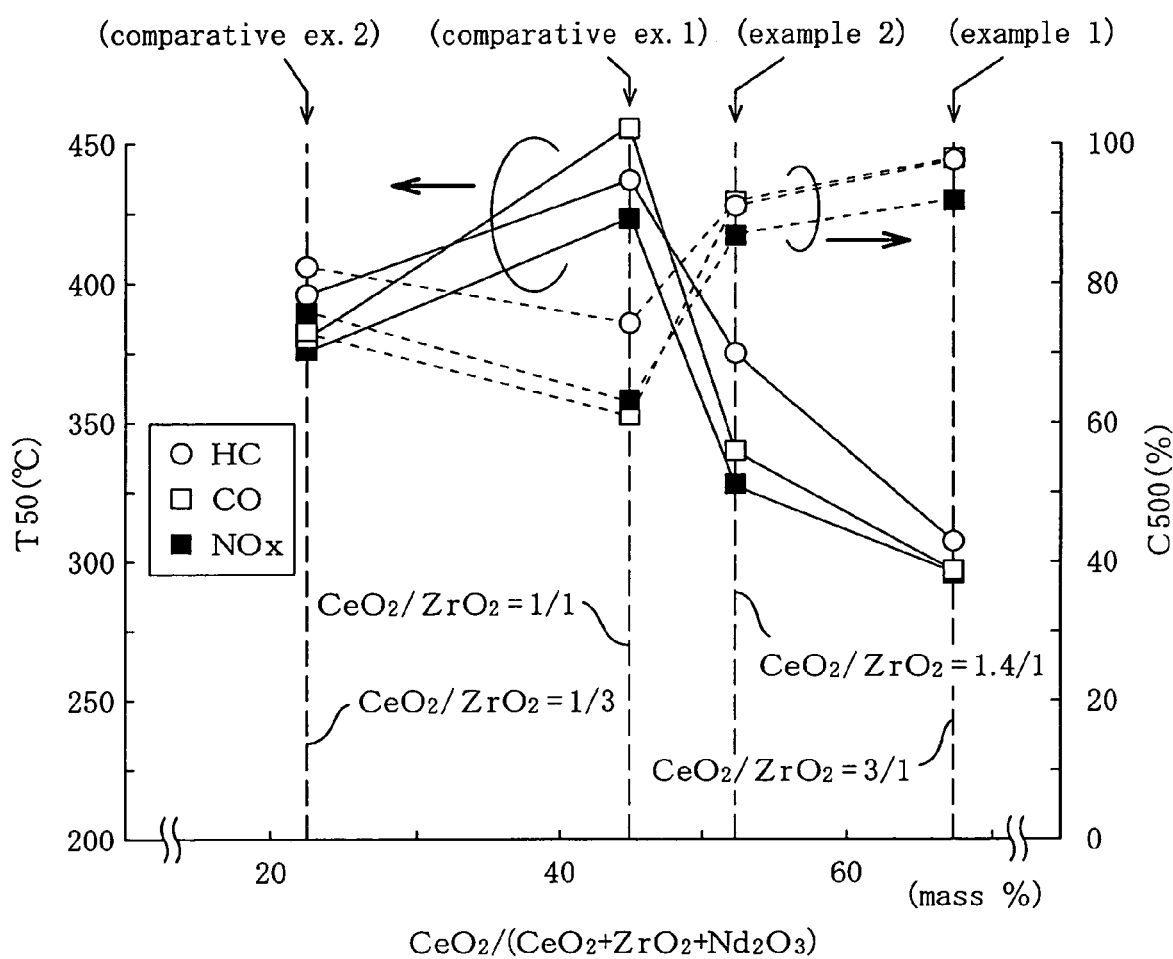
FIG. 3 is a graph showing the relation between the $CeO_2/ZrO_2$ mass ratio and each of T50 and C500 for various catalysts.

The measurement results are shown in FIG. 3, where the solid polygonal lines indicate T50 and the dashed polygonal lines indicate C500. As shown in the figure, for all of the conversions of HC, CO and NOx, the catalysts of Examples 1 and 2 were lower in T50 than the catalysts of Comparative examples 1 and 2. Further, for all of the conversions of HC, CO and NOx, the catalysts of Examples 1 and 2 were higher in C500 than the catalysts of Comparative examples 1 and 2.

Furthermore, it can be understood from the figure that if the ratio of $CeO_2/(CeO_2+ZrO_2+Nd_2O_3)$ in the mixed oxide is higher than 50 mass %, i.e., if the $CeO_2/ZrO_2$ mass ratio is greater than 1.25/1, both characteristics of T50 and C500 become excellent, and that particularly if the $CeO_2/ZrO_2$ mass ratio is greater than 1.4/1, this is advantageous in improvement of low-temperature catalytic activity and high-temperature catalytic conversion. Furthermore, FIG. 3 shows that the best results were obtained when the $CeO_2/ZrO_2$ mass ratio is 3/1. However, it is recognized that even if the $CeO_2/ZrO_2$ mass ratio is greater than 3/1, both characteristics of T50 and C500 become saturated. In addition, if the ratio of $ZrO_2$ to $CeO_2$ is smaller, the heat resistance of the catalyst becomes lower. Therefore, the upper limit of the $CeO_2/ZrO_2$ mass ratio is about 5/1, preferably about 4/1. Furthermore, as can be seen from FIG. 3, if the $CeO_2/ZrO_2$ mass ratio is 1.4/1 to 3/1 both inclusive, this provides excellent T50 and C500 characteristics.

Ceria-Rich Composition; Determination of $Nd_2O_3/(CeO_2+ZrO_2+Nd_2O_3)$ Ratio

EXAMPLES 1, 3, 4 AND 5 AND COMPARATIVE EXAMPLES 3 AND 4

A can be seen from FIG. 3, the best catalytic performance results were obtained when the $CeO_2/ZrO_2$ mass ratio is 3/1. On the basis of the results, mixed oxides of Examples 1, 3, 4 and 5 and Comparative examples 3 and 4 were prepared, in the same manner as in the previously cited examples and comparative examples, to have respective percent compositions shown in Table 2 (where they have the same $CeO_2/ZrO_2$ mass ratio of 3/1 and different ratios of $Nd_2O_3/(CeO_2+ZrO_2+Nd_2O_3)$). Then, catalysts were prepared using the obtained mixed oxides. The catalysts were aged in the same manner as in the previously cited examples and comparative examples.

TABLE 2

| | Percent composition (mass %) | | | | $CeO_2/$ | $Nd_2O_3/(CeO_2 +$ |
|---|---|---|---|---|---|---|
| | $Nd_2O_3$ | $CeO_2$ | $ZrO_2$ | Rh | $ZrO_2$ | $ZrO_2 + Nd_2O_3)$ |
| Comparative ex. 3 | 0 | 74.9 | 24.9 | 0.1116 | 3/1 | 0 mass % |
| Example 3 | 3 | 72.7 | 24.2 | 0.1116 | 3/1 | 3 mass % |
| Example 1 | 10 | 67.4 | 22.5 | 0.1116 | 3/1 | 10 mass % |
| Example 4 | 15 | 63.7 | 21.2 | 0.1116 | 3/1 | 15 mass % |
| Example 5 | 20 | 59.9 | 20.0 | 0.1116 | 3/1 | 20 mass % |
| Comparative ex. 4 | 30 | 52.4 | 17.5 | 0.1116 | 3/1 | 30 mass % |

Evaluation of Catalyst Performance

Figure 4:
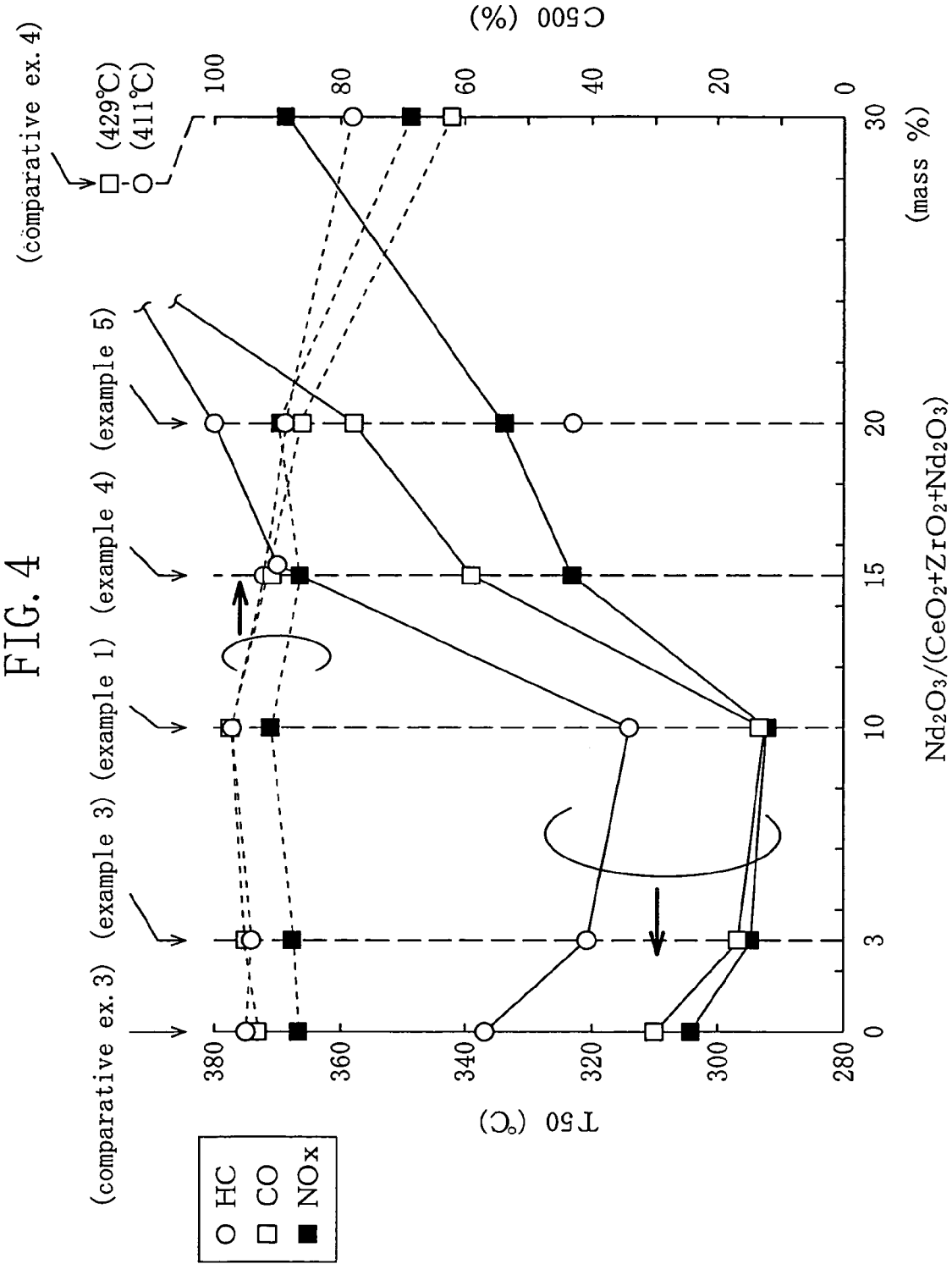
FIG. 4 is a graph showing the relation between the $Nd_2O_3$ ratio and each of T50 and C500 for various catalysts.

After aged in the above manner, each catalyst was measured in terms of light-off temperatures T50 and high-temperature catalytic conversion efficiencies C500 for conversions of HC, CO and NOx in the first-mentioned manner. The measurement results are shown in FIG. 4, where the solid polygonal lines indicate T50 and the dashed polygonal lines indicate C500.

As can be seen from FIG. 4, both characteristics of T50 and C500 exhibit excellent results when the ratio of $Nd_2O_3/(CeO_2+ZrO_2+Nd_2O_3)$ (hereinafter, referred to as $Nd_2O_3$ ratio) is 3 mass % and 10 mass %. Therefore, it is obvious that if the $Nd_2O_3$ ratio is 3 to 10 mass % both inclusive, the catalyst exhibits excellent catalytic performance. Further, with the increase of the $Nd_2O_3$ ratio from 0 mass %, T50 gradually decreases and C500 gradually increases until the $Nd_2O_3$ ratio reaches 10 mass %. If the $Nd_2O_3$ ratio further increases over 10 mass %, T50 and C500 are turned toward increasing and decreasing, respectively. Furthermore, when the $Nd_2O_3$ ratio is about 12 mass %, T50 and C500 characteristics exhibit results substantially equal to or more excellent than when it is 0 mass %. Therefore, it can be said that the $Nd_2O_3$ ratio is preferably 12 mass % or less.

Furthermore, the above evaluation results show that when the $Nd_2O_3$ ratio is higher than 12 mass %, T50 and C500 characteristics become poorer when it is 0 mass %. However, it can be recognized from the following XRD (X-Ray Diffractometry) results that if the $Nd_2O_3$ ratio until 20 mass % provides the effect of improving the heat resistance of the catalyst.

XRD

The mixed oxides of Examples 1 to 3 and 5 and Comparative examples 1 and 2 were structurally analyzed by XRD in both the cases as they were fresh and after they were aged (heated at 1000° C. in a normal atmosphere for 24 hours). FIGS. 5A, 6A, 7A, 8A, 9A and 10A shows XRD patterns of the mixed oxides when they were fresh, and FIGS. 5B, 6B, 7B, 8B, 9B and 10B shows XRD patterns of the mixed oxides after they were aged.

Figure 5A:
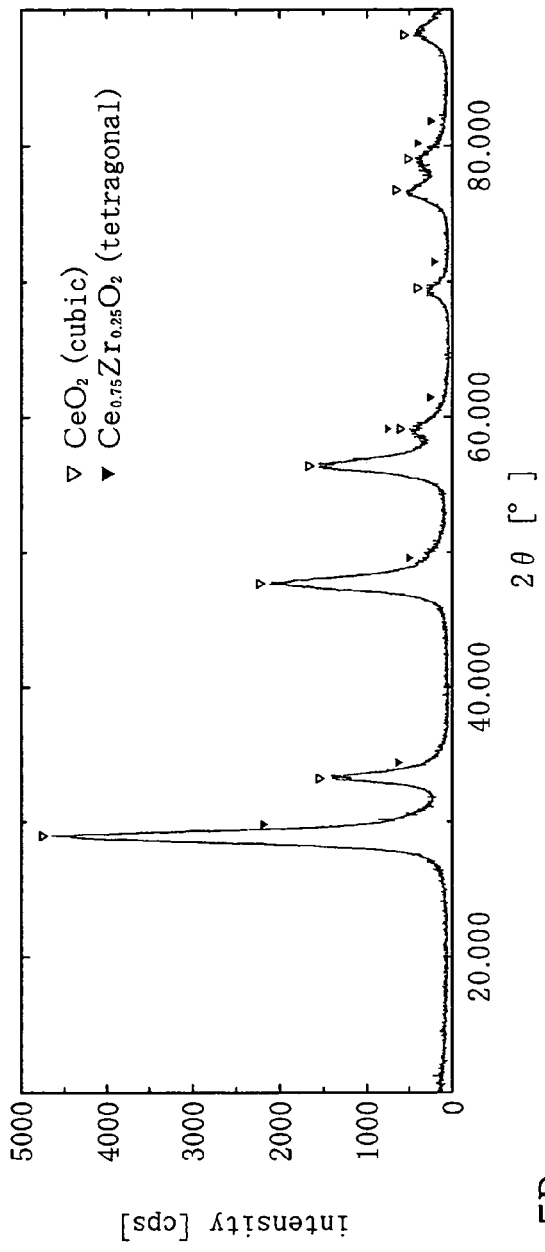
FIGS. 5A and 5B show XRD patterns for a mixed oxide of Example 1 of the present invention when the mixed oxide is fresh and after it is aged, respectively.
Figure 5B:
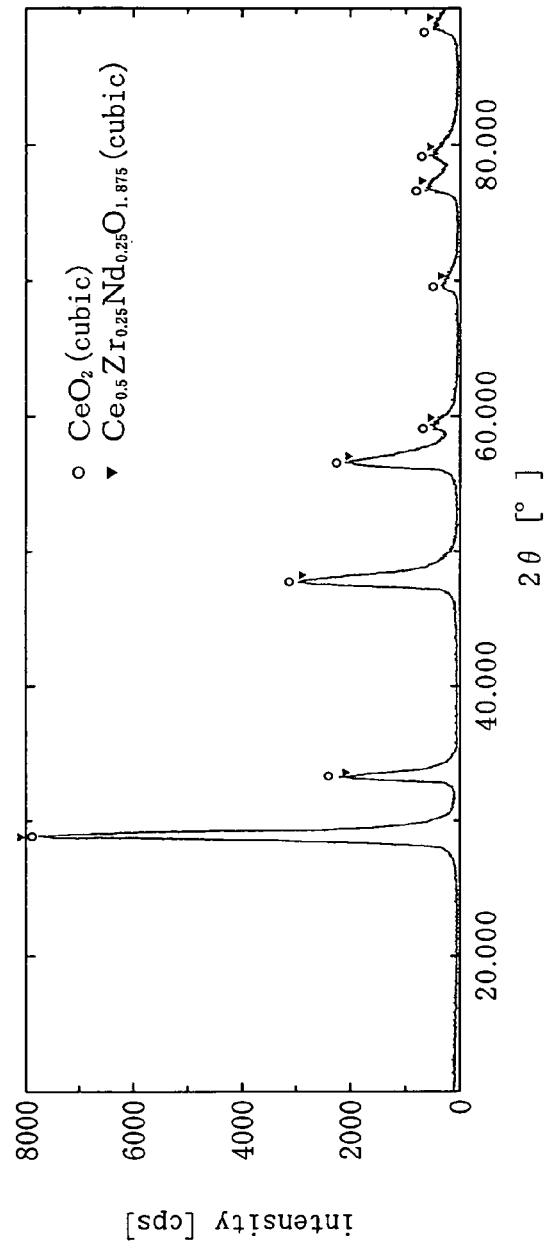
Figure 7A:
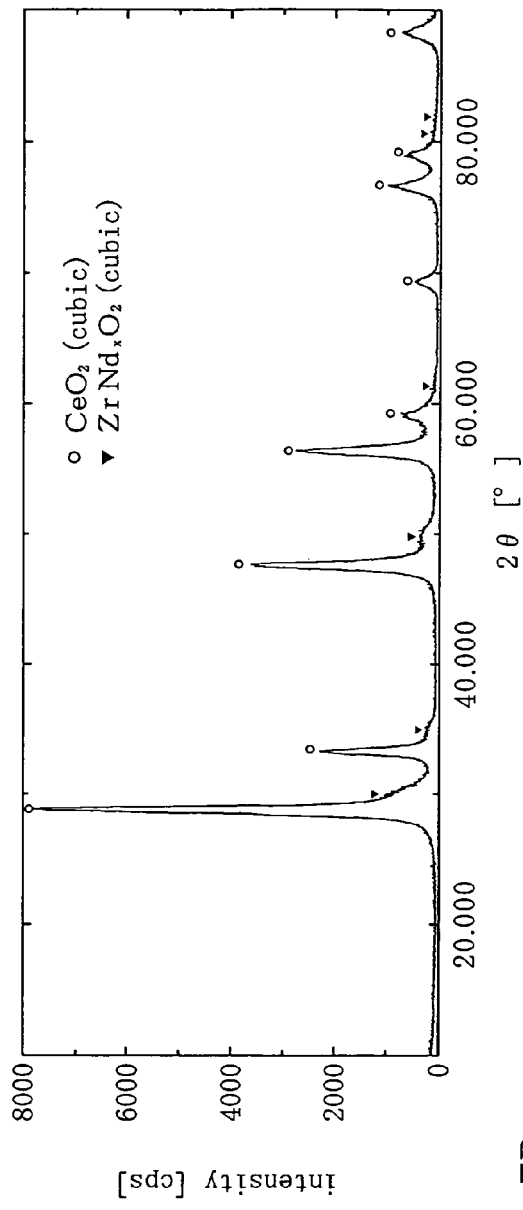
FIGS. 7A and 7B show XRD patterns for a mixed oxide of Example 3 of the present invention when the mixed oxide is fresh and after it is aged, respectively.
Figure 7B:
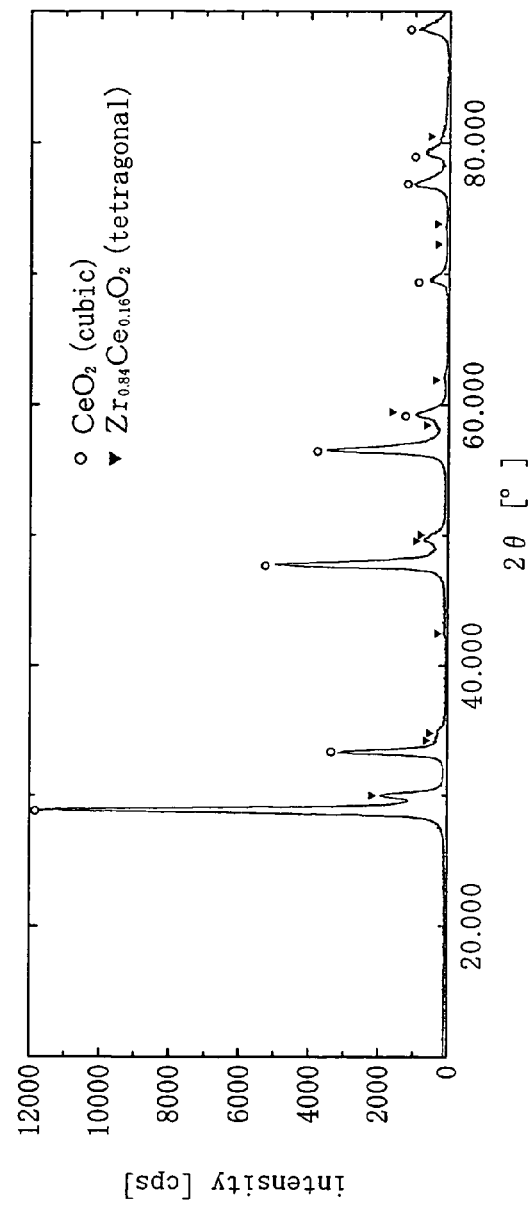

Referring to FIG. 5 (Example 1; $CeO_2/ZrO_2$ mass ratio of 3/1 and $Nd_2O_3$ ratio of 10 mass %), FIG. 6 (Example 2; $CeO_2/ZrO_2$ mass ratio of 1.4/1 and $Nd_2O_3$ ratio of 10 mass %) and FIG. 7 (Example 3; $CeO_2/ZrO_2$ mass ratio of 3/1 and $Nd_2O_3$ ratio of 3 mass %), when the mixed oxides of these examples were fresh (see FIGS. 5A, 6A, 7A, 8A, 9A and 10A), they each have a multi-phase crystal structure in which a $CeO_2$ crystal phase and another one or two mixed oxide crystal phases are mixed. Therefore, it can be said that if they are heated, different crystals of different phases interfere with each other to prevent crystal grain growth, which makes it less possible that Rh atoms which should be exposed as catalytic precious metal at the surfaces of the mixed oxides will be buried inside them. Further, even after aged (see FIGS. 5B, 6B, 7B, 8B, 9B and 10B), they each have a multi-phase crystal structure though their crystal compositions have changed. This shows that they have high heat resistance.

On the other hand, referring to FIG. 9 (Comparative example 1; $CeO_2/ZrO_2$ mass ratio of 1/1 and $Nd_2O_3$ ratio of 10 mass %) and FIG. 10 (Comparative example 2; $CeO_2/ZrO_2$ mass ratio of 1/3 and $Nd_2O_3$ ratio of 10 mass %), these mixed oxides of Comparative examples 1 and 2 each have a single-phase crystal structure of $CeZrNdO_2$ crystals either when fresh or after aged. This is probably because the $CeO_2/ZrO_2$ mass ratio is small. Therefore, it can be said that with these mixed oxides, crystal grain growth is likely to occur and Rh atoms serving as catalytic precious metal are likely to be buried in crystal grains of the mixed oxides.

The XRD results of FIGS. 5 to 7, 9 and 10 are in good agreement with the evaluation results shown in FIGS. 3 and 4.

Figure 8A:
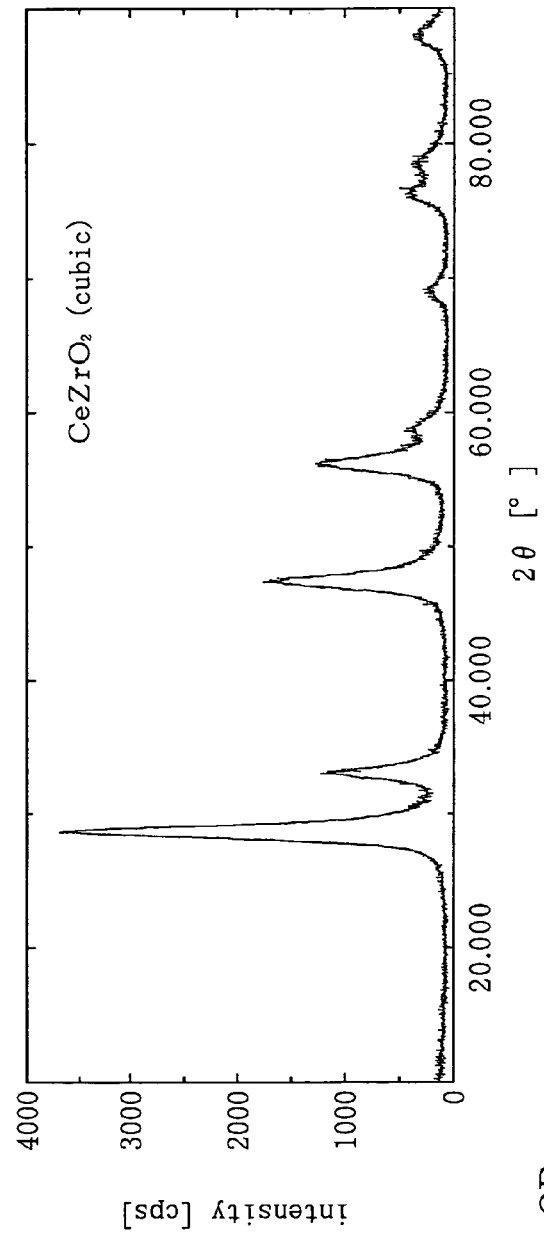
FIGS. 8A and 8B show XRD patterns for a mixed oxide of Example 5 of the present invention when the mixed oxide is fresh and after it is aged, respectively.
Figure 8B:
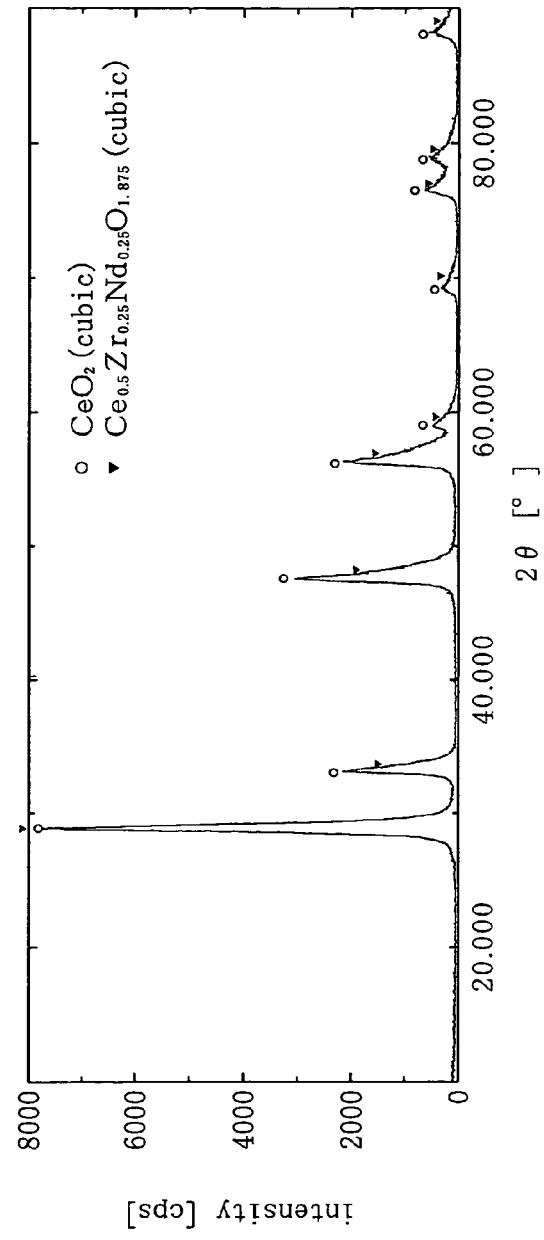
Figure 9A:
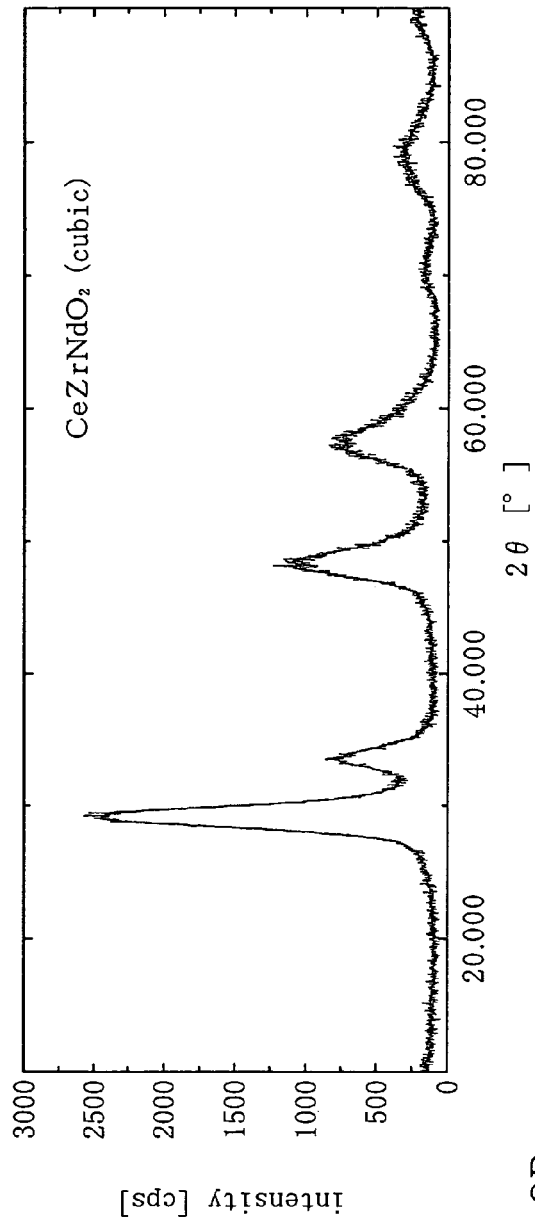
FIGS. 9A and 9B show XRD patterns for a mixed oxide of Comparative example 1 when the mixed oxide is fresh and after it is aged, respectively.
Figure 9B:
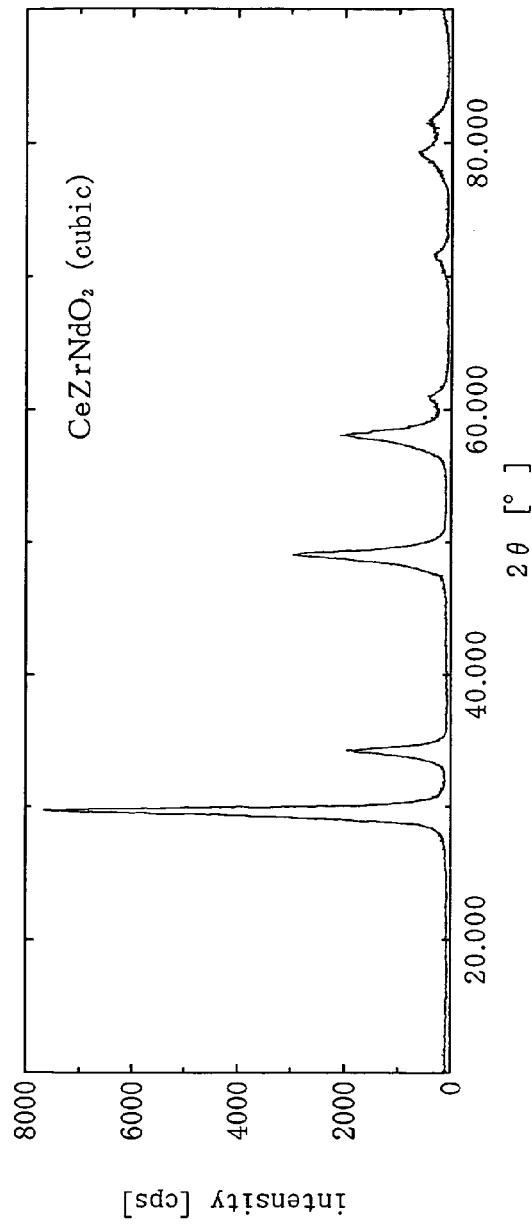

Next, referring to FIG. 8 (Example 5; $CeO_2/ZrO_2$ mass ratio of 3/1 and $Nd_2O_3$ ratio of 20 mass %), this mixed oxide of Example 5 has a single-phase crystal structure of $CeZrNdO_2$ crystals when fresh (see FIG. 8A) but has a two-phase crystal structure of $CeO_2$ crystals and $Ce_{0.5}Zr_{0.25}O_{1.875}$ crystals after aged (see FIG. 8B). Therefore, it can be said that different crystals of different phases prevent crystal grain growth like Examples 1 to 3 to makes it less possible that Rh atoms at the mixed oxide surface will be buried inside the mixed oxide, and that the mixed oxide has a high heat resistance.

Now, Examples 1, 3 and 5 having a $CeO_2/ZrO_2$ mass ratio of 3/1 will be observed in terms of the half-width of the peak which appears in the vicinity of $2\theta=28.5°$ of $CeO_2$ crystals. The mixed oxide of Example 3 having a $Nd_2O_3$ ratio of 3 mass % has the smallest half-peak widths of 0.610° when fresh and 0.413° after aged. Therefore, the mixed oxide of Example 3 has the highest degree of crystallization and is in turn least likely to cause crystal grain growth.

When the mixed oxide containing Ce, Zr, Nd and doped with catalytic precious metal has a high $Nd_2O_3$ ratio as shown in Example 5 of FIG. 8, the half-peak width is wide so that the degree of crystallization of $CeO_2$ crystals is low. Such a mixed oxide, however, has different crystals of different crystal phases by aging. Therefore, until its $Nd_2O_3$ ratio reaches about 20 mass %, the increase in the $CeO_2/ZrO_2$ mass ratio can provide a mixed oxide having a multi-phase crystal structure and therefore offer the specific effect for the present invention, i.e., the effect of enhancing the heat resistance (preventing crystal grain growth).

Zirconia-Rich Composition; Determination of $Nd_2O_3/(CeO_2+ZrO_2+Nd_2O_3)$ Ratio Next, the determination of a preferable ratio of $Nd_2O_3/(CeO_2+ZrO_2+Nd_2O_3)$ in zirconia-rich mixed oxides will be described.

Preparation of Catalyst

Six mixed oxides (catalytic materials) having different ratios of $Nd_2O_3/(CeO_2+ZrO_2+Nd_2O_3)$, i.e., 0, 2.6, 10, 20, 30 and 50 mass %, were prepared in the following manner. All of these mixed oxides have a $ZrO_2/(CeO_2+ZrO_2)$ ratio of 75 mass % and contains 0.125% Rh with respect to the mass of each mixed oxide.

Respective predetermined amounts of zirconium oxynitrate solution, cerous nitrate solution, neodymium (III) nitrate hydrate solution and rhodium nitrate solution were mixed with water to make a total volume of 300 mL of mixed solution, and the mixed solution was stirred at room temperature for about an hour. The mixed solution was heated to 80° C. and then mixed with 50 mL of 28% aqueous ammonia. The reaction between the mixed solution and the aqueous ammonia was completed within one second by adding the aqueous ammonia to the mixed solution at a stroke and mixing and stirring them. The cloudy solution resulting from the mixture of aqueous ammonia was allowed to stand for a day and night to produce a cake, and the cake was centrifuged and sufficiently rinsed in water. The water-rinsed cake was dried by heating it at approximately 150° C., and then calcined under the condition of keeping it at 400° C. for five hours and then keeping it at 500° C. for two hours.

Also in each of the resultant-mixed oxides obtained in the above manner, Rh atoms are placed at crystal lattice points of the mixed oxide like Ce, Zr and Nd atoms. Otherwise, Rh atoms are placed between crystal lattice points of the mixed oxide. In either case, Rh atoms are dispersed uniformly on the surface and inside the mixed oxide.

The above mixed oxides were individually mixed with respective predetermined amounts of active alumina, a binder (Zircozol AC-7 made by Daiichi Kigenso Kagaku Kogyo Co., Ltd) and water to prepare slurries. Honeycomb supports made of cordierite were immersed in and then pulled out of the prepared slurries, respectively. Excess slurries were blown off from the honeycomb supports, and the supports were calcined at 500° C. for two hours, thereby obtaining catalysts Each of the catalysts used a support having 24 mL volume, 400 cells per square inch (approximately 6.54 $cm^2$), and 4 mill (approximately 0.1 mm) inter-cell wall thickness. The amount of supported catalytic material per L of support in each catalyst is 0.181 g, wherein the amounts of supported mixed oxide, active alumina and zirconia binder are 112 g/L, 51 g/L and 18 g/L, respectively. The amount of supported Rh in each catalyst is 112 g/L×0.125 mass %=0.14 g/L. The catalysts were aged by keeping them at 1000° C. in a normal atmosphere for 24 hours.

Evaluation of Catalyst Performance

After aged in the above manner, each catalyst was measured in terms of light-off temperatures T50 and high-temperature catalytic conversion efficiencies C500 for conversions of HC, CO and NOx, in the same conditions and manner as in the case of ceria-rich mixed oxides by using a model gas flow reactor and an exhaust gas analyzer.

Figure 11:
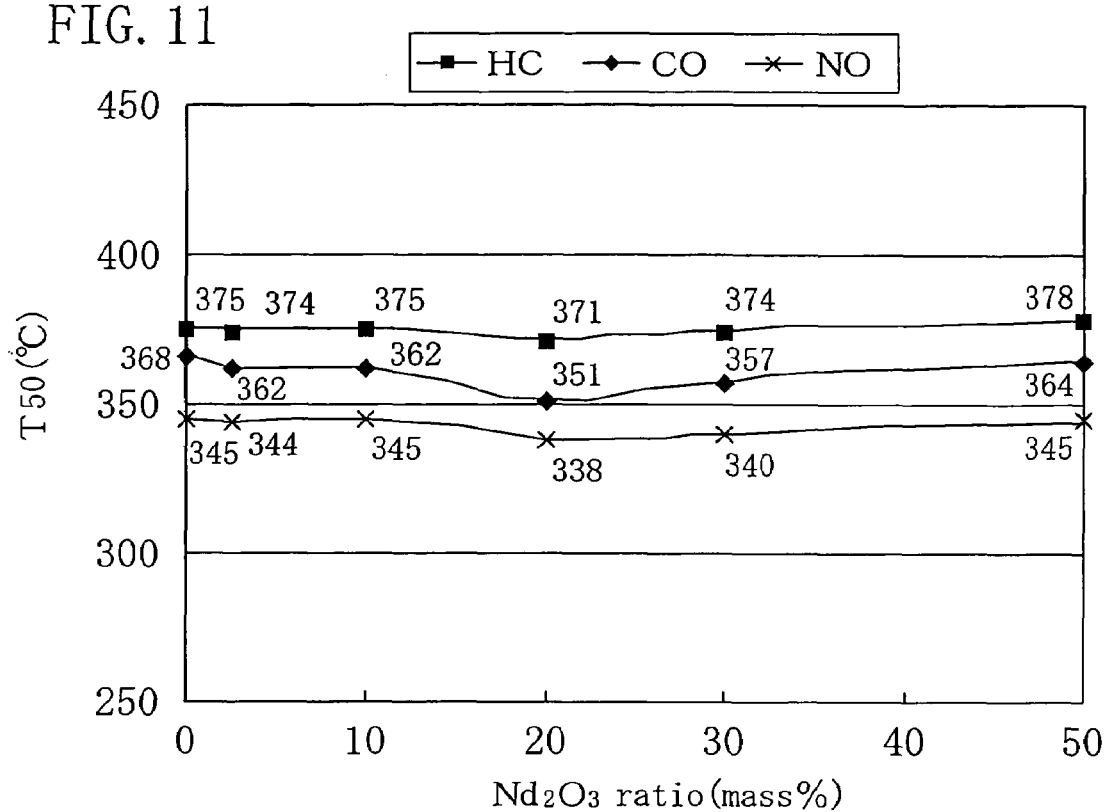
FIG. 11 is a graph showing T50 of catalysts in which their mixed oxides have different $Nd_2O_3$ ratios.
Figure 12:
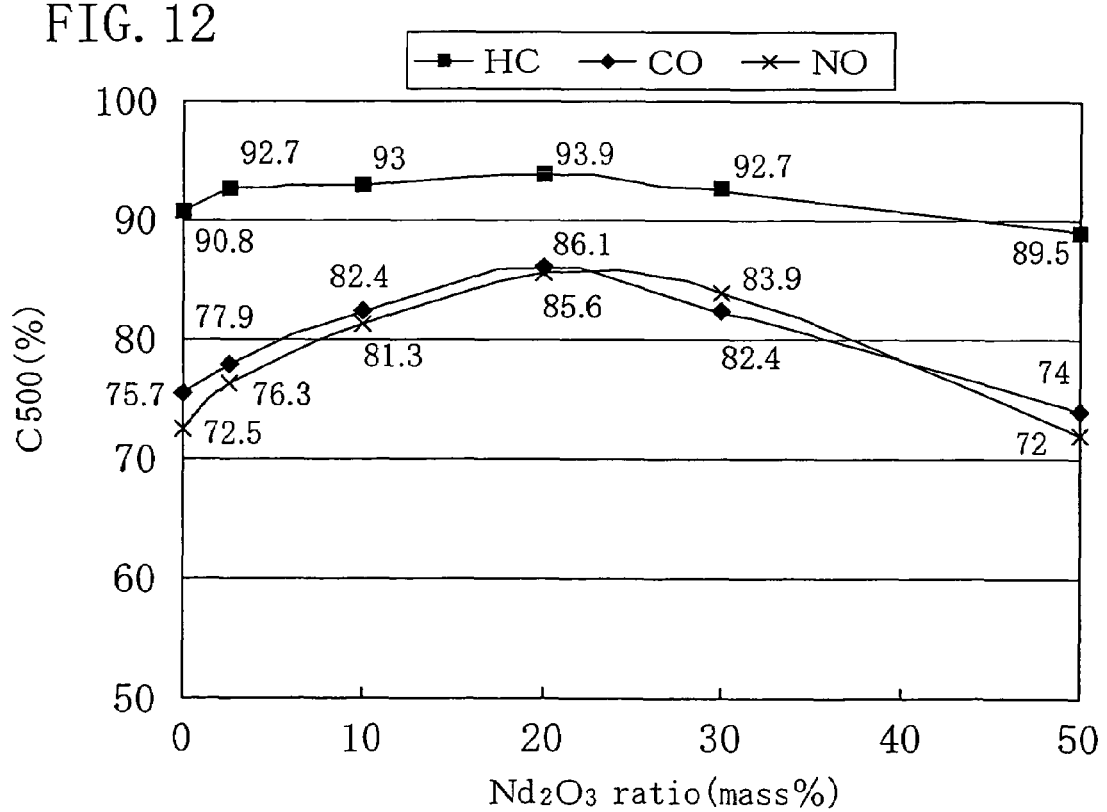
FIG. 12 is a graph showing C500 of catalysts in which their mixed oxides have different $Nd_2O_3$ ratios.

FIGS. 11 and 12 show the measurement results of T50 and C500, respectively. In FIGS. 11 and 12 and FIGS. 13 and 14 described later, the $Nd_2O_3$ ratio means the ratio of $Nd_2O_3/(CeO_2+ZrO_2+Nd_2O_3)$.

Referring to T50 (FIG. 11), in respect of HC, T50 is not significantly changed even if the $Nd_2O_3$ ratio is increased, but it becomes slightly lower when the $Nd_2O_3$ ratio is 20 mass %. In respect of CO and NO, there is a tendency that T50 decreases with the increase in the $Nd_2O_3$ ratio until the $Nd_2O_3$ ratio reaches 20 mass %, and then increases with the increase in the $Nd_2O_3$ ratio. On the other hand, referring to C500 (FIG. 12), in respect of all of HC, CO and NO, there is a tendency that C500 increases with the increase in the $Nd_2O_3$ ratio until the $Nd_2O_3$ ratio reaches 20 mass %, and then decreases with the increase in the $Nd_2O_3$ ratio. This tendency is particularly remarkable in respect of CO and NO. Further, when the $Nd_2O_3$ ratio reaches 50 mass %, C500 becomes lower than when it is 0 mass %.

From the above tendencies of change of T50 and C500 with the increase in the $Nd_2O_3$ ratio shown in FIGS. 11 and 12, it can be understood that the $Nd_2O_3$ ratio is preferably 40 mass % or less, more preferably 35 mass % or less, still more preferably 30 mass % or less.

BET Specific Surface Area

Figure 13:
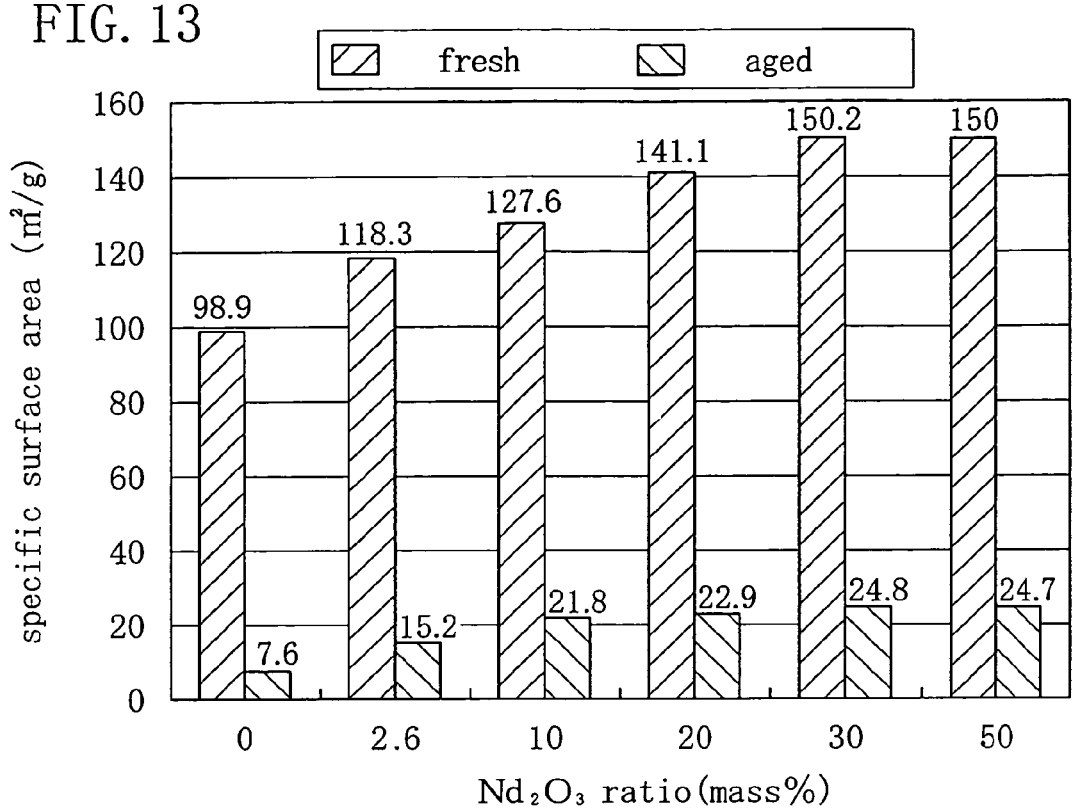
FIG. 13 is a graph showing BET specific surface areas of mixed oxides having different $Nd_2O_3$ ratios in both the cases when each mixed oxide is fresh and after it is aged.

In order to examine the reasons why the higher $Nd_2O_3$ ratio, the better T50 and C500 characteristics become, the above six mixed oxides having different $Nd_2O_3$ ratios were measured in terms of specific surface area in both the cases when they were fresh (before they were aged) and after they were aged using the BET (Brunauer-Emmer-Teller) method. The measurement results are shown in FIG. 13. The figure shows that the specific surface areas increase with the increase in the $Nd_2O_3$ ratio until the $Nd_2O_3$ ratio reaches 30 mass %. It can be seen from this that the $Nd_2O_3$ ratio has a large influence on the specific surface area of the mixed oxide. The figure also shows that when the $Nd_2O_3$ ratio exceeds 2.6 mass %, the specific surface area becomes 120 $m^2/g$ or more.

Figure 14:
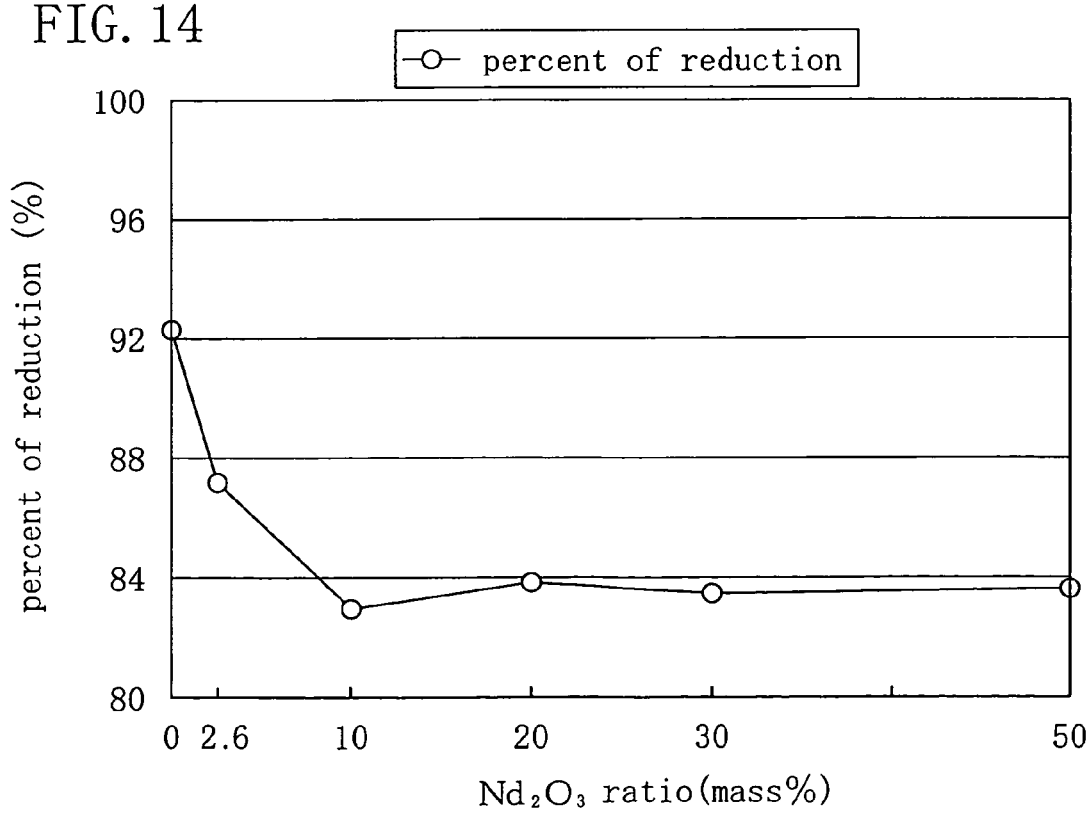
FIG. 14 is a graph showing the degrees of reduction in the specific surface areas of mixed oxides with different $Nd_2O_3$ ratios after they are aged.

Referring to the percent of reduction in the specific surface areas of the mixed oxides due to the aging ({(value when fresh)−(value after aged)}/(value when fresh)) shown in FIG. 14, the percent of reduction abruptly declines until the $Nd_2O_3$ ratio reaches 10 mass % and then does not-substantially change even if the $Nd_2O_3$ ratio increases.

In view of the above, one of the reasons when higher $Nd_2O_3$ ratio provides better characteristics of T50 and C500 can be considered to be that with the increase in the $Nd_2O_3$ ratio, not only the mixed oxide increases its specific surface area but also decreases the percent of reduction in the specific surface area due to aging, so that the mixed oxide can keep a large specific surface area even after aged. Further, from the tendencies of changes in specific surface area and its percent of reduction with the increase in the $Nd_2O_3$ ratio shown in FIGS. 13 and 14, it can be said that the $Nd_2O_3$ ratio is preferably higher than 2.6 mass %, more preferably 5 mass % or more, still more preferably 10 mass % or more.

XRD Patterns of Mixed Oxides

Figure 15:
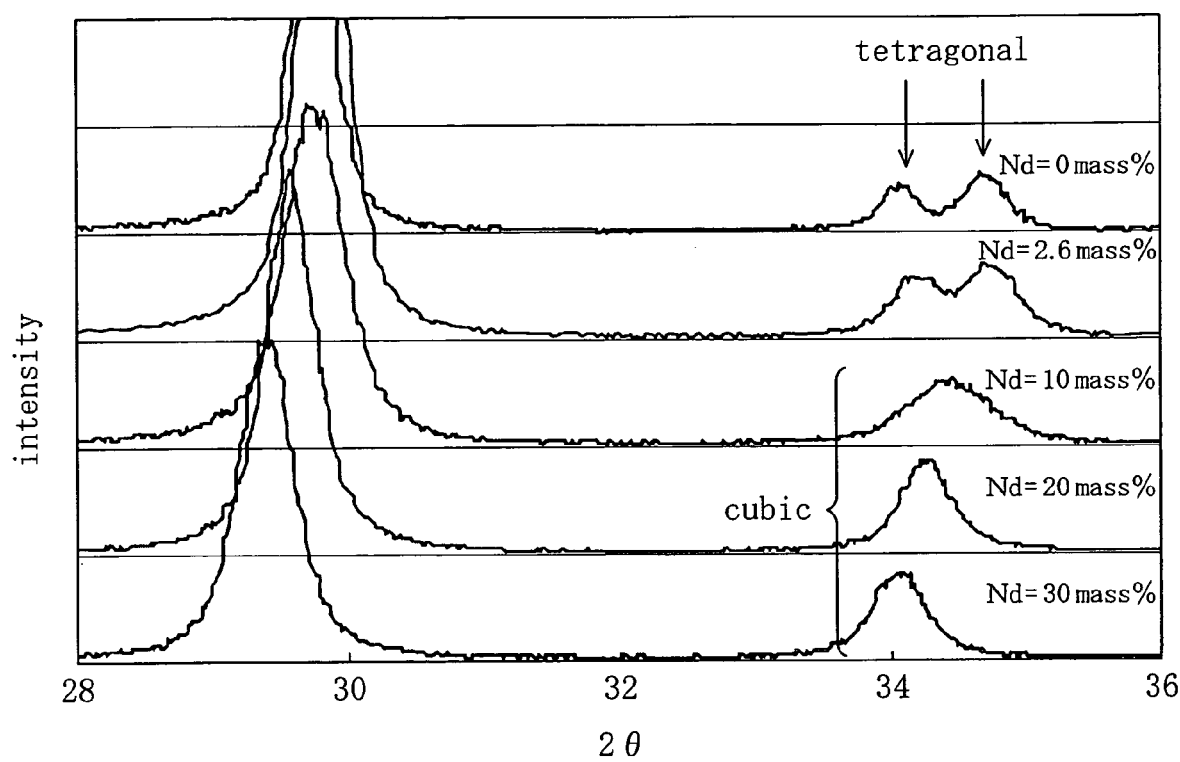
FIG. 15 shows XRD patterns for mixed oxides having different $Nd_2O_3$ ratios.

The five mixed oxides other than the mixed oxide having a $Nd_2O_3$ ratio of 50 mass % were structurally analyzed by XRD after they were aged (kept at 1000° C. in a normal atmosphere for 24 hours). FIG. 15 shows the XRD patterns for the five mixed oxides. In the figure, "Nd=" in, for example, "Nd=0 mass %" is an abbreviation of "$Nd_2O_3$ ratio=".

As can be seen from FIG. 15, though the mixed oxide having a $Nd_2O_3$ ratio of 0 mass % has a tetragonal systems, the mixed oxide having a $Nd_2O_3$ ratio of 2.6 mass % has a crystal system close to a cubic system and the mixed oxides having higher $Nd_2O_3$ ratios have stronger tendencies toward the cubic system. With the increase in the $Nd_2O_3$ ratio, the mixed oxide gradually changes its crystal structure from the tetragonal system toward the cubic system and accordingly becomes thermally more stable, i.e., higher in heat resistance and more advantageous in securing a large specific surface area. Further, since $CeO_2$ having an excellent oxygen storage capacity has a cubic system, the change of the crystal structure of the mixed oxide toward a cubic system means the mixed oxide has a better oxygen storage capacity. This is advantageous in improving the low-temperature catalytic activity and high-temperature catalytic performance.

Zirconia-Rich Composition; Determination of $ZrO_2/(CeO_2+ZrO_2)$ Ratio

Figure 16:
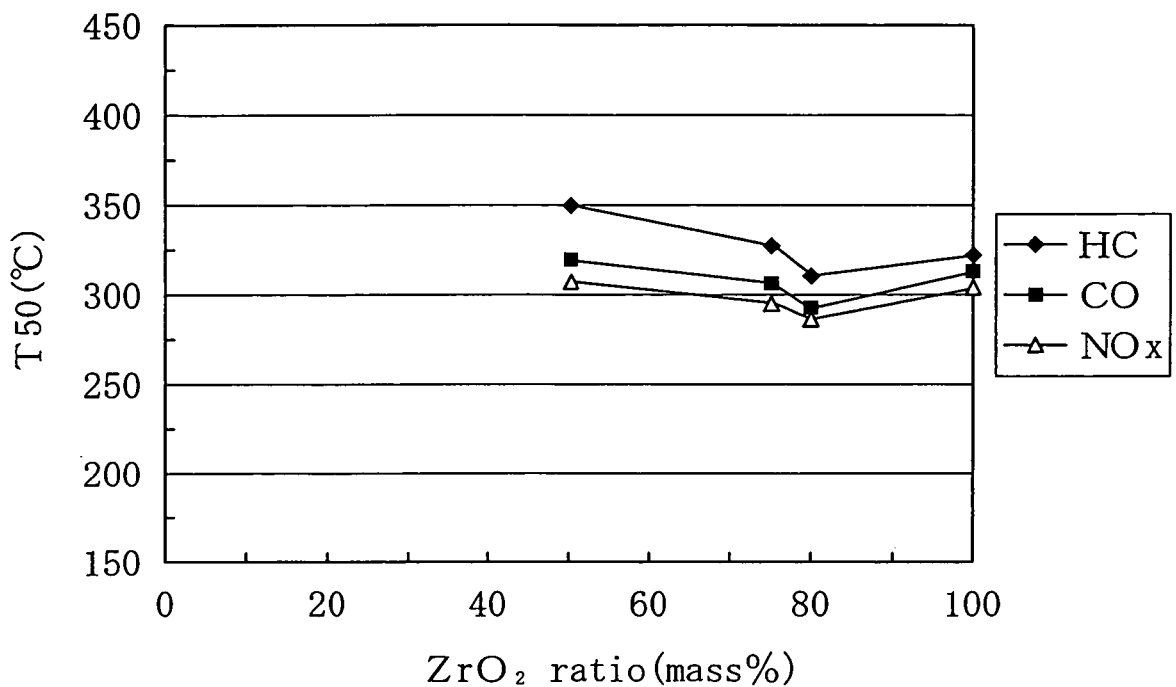
FIG. 16 is a graph showing the relation between the $ZrO_2$ ratio and T50 for various catalysts.
Figure 17:
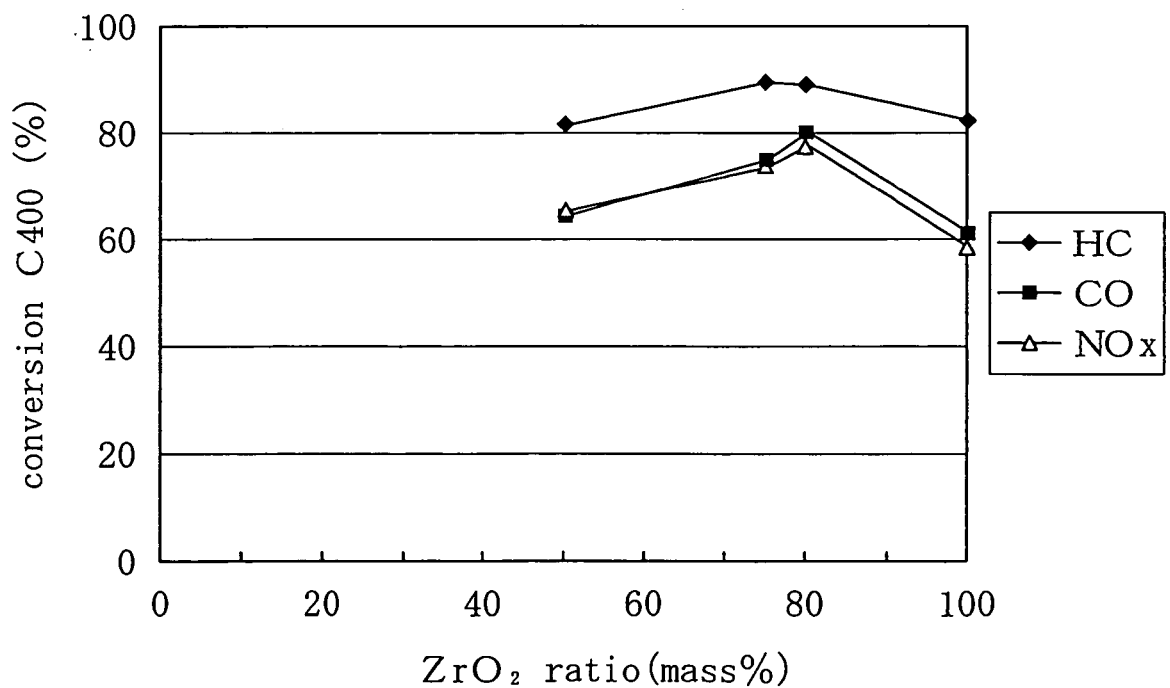
FIG. 17 is a graph showing the relation between the $ZrO_2$ ratio and C400 for various catalysts.

Ce—Zr-based mixed oxides having different $ZrO_2$ ratios (ratios of $ZrO_2/(CeO_2+ZrO_2)$), i.e., 50, 75, 80 and 100 mass %, were prepared in the same manner as in the preceding case (wherein the mixed oxides contain 0.486 mass % rhodium and no neodymium), and the resultant mixed oxides were used to prepare catalysts in the same manner as in the preceding case (wherein the amount of supported Rh per L of support in each catalyst is 0.27 g). The resultant catalysts were aged by keeping them at 1000° C. in a normal atmosphere for 24 hours and then measured in terms of light-off temperatures T50 and high-temperature catalytic conversion efficiencies C400 for conversions of HC, CO and NOx, in the same manner as in the above catalyst performance evaluation. C400 indicates the catalytic conversion efficiency when the gas temperature at the catalyst entrance is 400° C. FIGS. 16 and 17 show the measurement results of T50 and C400, respectively.

FIGS. 16 and 17 show that when the $ZrO_2$ ratio is 80%, T50 and C400 characteristics exhibit the best results. From the figures, it can be seen that good results can be obtained when the $ZrO_2$ ratio is within the range from 65 to 90 mass % both inclusive, particularly within the range from 70 to 90 mass % both inclusive.

What is claimed is:

1. An exhaust gas purification catalyst comprising:
   a honeycomb support; and
   a catalytic layer formed on wall surfaces of each cell of the honeycomb support and contains active alumina and a mixed oxide having oxygen storage/release capacity containing Ce, Zr and Nd and doped with precious metal to place atoms of the precious metal at and/or between crystal lattice points of the mixed oxide,
   wherein the mixed oxide has a $CeO_2/ZrO_2$ mass ratio of 1.4 or more and the ratio of $Nd_2O_3/(CeO_2+ZrO_2+Nd_2O_3)$ in the mixed oxide is 20 mass % or less.

2. The exhaust gas purification catalyst of claim 1, wherein the ratio of $Nd_2O_3/(CeO_2+ZrO_2+Nd_2O_3)$ in the mixed oxide is 12 mass % or less.

3. An oxygen storage component for an exhaust gas purification catalyst, composed of a mixed oxide that contains Ce, Zr and Nd, is doped with precious metal to place atoms of the precious metal at and/or between crystal lattice points of the mixed oxide and is used in a catalytic layer on wall surfaces of each cell of a honeycomb support,
   wherein the mixed oxide has a $CeO_2/ZrO_2$ mass ratio of 1.4 or more and the ratio of $Nd_2O_3/(CeO_2+ZrO_2+Nd_2O_3)$ in the mixed oxide is 20 mass % or less.

4. The oxygen storage component of claim 3, wherein the ratio of $Nd_2O_3/(CeO_2+ZrO_2+Nd_2O_3)$ in the mixed oxide is 12 mass % or less.

5. An exhaust gas purification catalyst comprising:
   a honeycomb support; and
   a catalytic layer that is formed on wall surfaces of each cell of the honeycomb support and contains active alumina and a mixed oxide with oxygen storage/release capacity containing Ce, Zr and Nd and doped with precious metal to place atoms of the precious metal at and/or between crystal lattice points of the mixed oxide,
   wherein the ratio of $ZrO_2/(CeO_2+ZrO_2)$ in the mixed oxide is within the range from 65 to 90 mass % both inclusive and the ratio of $Nd_2O_3/(CeO_2+ZrO_2+Nd_2O_3)$ in the mixed oxide is within the range from 2.6 exclusive to 40 mass % inclusive.

6. An oxygen storage component for an exhaust gas purification catalyst, composed of a mixed oxide that contains Ce, Zr and Nd and is doped with precious metal to place atoms of the precious metal at and/or between crystal lattice points of the mixed oxide,
   wherein the ratio of $ZrO_2/(CeO_2+ZrO_2)$ in the mixed oxide is within the range from 65 to 90 mass % both inclusive and the ratio of $Nd_2O_3/(CeO_2+ZrO_2+Nd_2O_3)$ in the mixed oxide is within the range from 2.6 exclusive to 40 mass % inclusive.

7. The oxygen storage component of claim 6, wherein the ratio of $Nd_2O_3/(CeO_2+ZrO_2+Nd_2O_3)$ in the mixed oxide is within the range from 5 to 35 mass % both inclusive.

* * * * *